S. H. MITCHELL.
Wheel-Cultivator.
No. 46,378.
Patented Feb. 14. 1865.
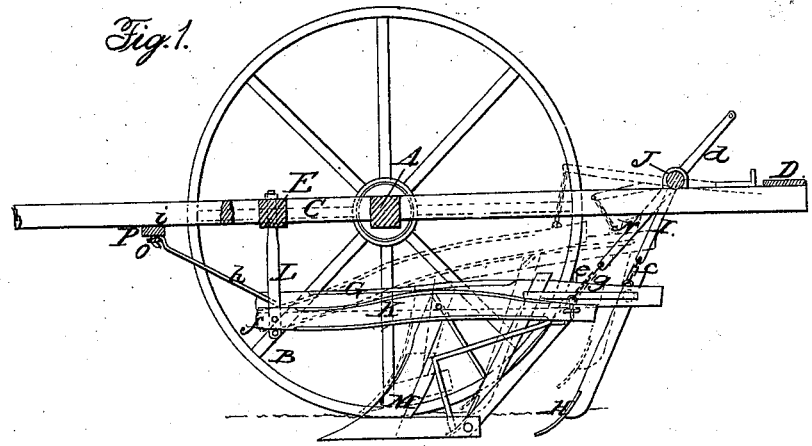
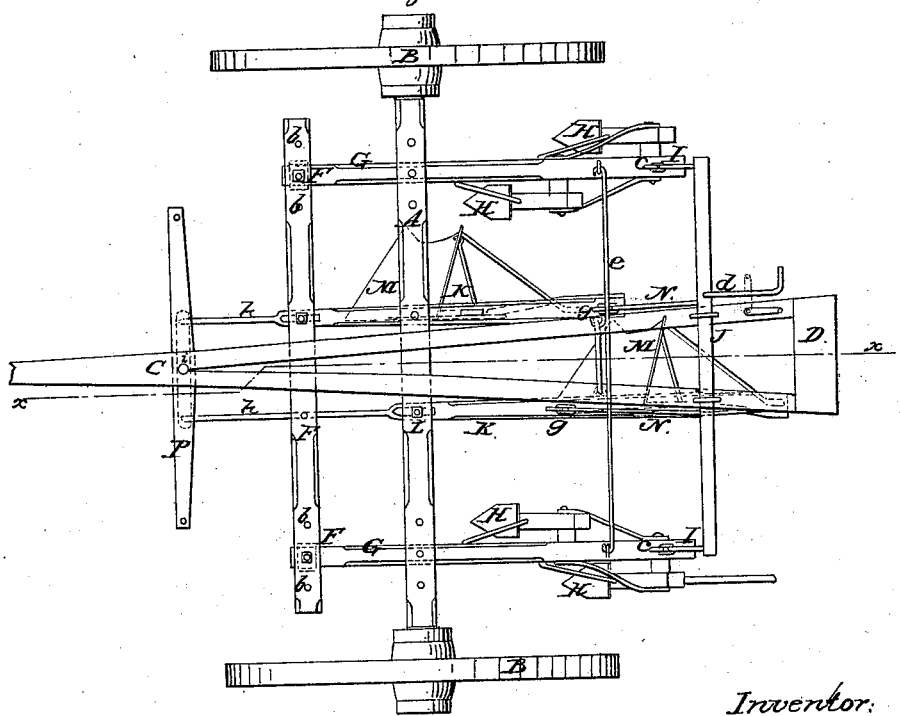

UNITED STATES PATENT OFFICE.

SAML. H. MITCHELL, OF EL PASO, ILLINOIS.

IMPROVED GANG-PLOW AND CULTIVATOR.

Specification forming part of Letters Patent No. 46,378, dated February 14, 1865.

*To all whom it may concern:*

Be it known that I, S. H. MITCHELL, of El Paso, in the county of Woodford and State of Illinois, have invented a new and Improved Gang-Plow and Cultivator; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to a new and improved device for plowing, cultivating crops, &c.; and it consists in a peculiar construction of the framing of the machine, the attachment of the plows thereto, as hereinafter fully shown and described, whereby the plows may be readily raised and lowered or adjusted to penetrate the earth at a greater or less depth, and also raised entirely out of the earth when necessary, and the framing by its peculiar construction rendered extremely simple and efficient.

To enable those skilled in the art to fully understand and construct my invention, I will proceed to describe it.

A represents an axle, having its wheels B B fitted loosely on each end of it; and C is the draft-pole, the back part of which is split longitudinally at its center and spread apart in U form, the driver's seat D being secured to the back end of the draft-pole. The draft-pole is fitted and secured in the upper surface of the axle A, the former extending some distance back of the latter, as shown in both figures.

E represents a bar, which is parallel with the axle A, and is secured to the draft-pole C a short distance in front of the axle. To this bar E there are secured two pendants, F F, one near each end, said pendants being forked at their lower ends to receive the front parts of plow-beams G G, the latter being secured in the pendants F by pins which pass horizontally through the beams and forks. The bar E has a series of holes, $b$, made vertically through it to admit of the pendants F being adjusted nearer together or farther apart, according to the distance it is required to have the plows apart.

The plow-beams G G have each two shovel-plows, H H, attached to them, which may be constructed in the ordinary way, and the back ends of the beams G G are connected by links $c$ to arms I, which are attached to a shaft, J, on the back part of the draft-pole. This shaft J is allowed to turn freely in its bearings, and has a lever, $d$, secured to it, by which said shaft is turned and the plows H H elevated above the surface of the ground when necessary, as shown in red in Fig. 3. The two plow-beams G G are connected by a rod or bar, $e$, which keeps the plow-beams G G in a proper relative position with each other.

K K are two plow-beams, the front ends of which are connected by horizontal pins $f$ with the lower ends of pendants L L, one of which is attached to the bar E and the other to the axle A. These plow-beams K have each a mold-board plow, M, attached to them, one plow M being in advance of the other, and the back ends of the beams K are connected by links $g$ with arms N, which are attached to the shaft J, so as to admit of the plows M being raised out of the ground when desired.

The front ends of the plow-beams K K are connected by rods $h\ h$ with the ends of a bar, O, which is fitted on the bolt $i$ of the whiffletree P, the bar O being below the whiffletree. These rods $h$ hold the plows M in proper position under the pull of the draft.

When the device is to be used as a gang-plow the plow-beams G G are removed and the beams K retained, and the plows M M removed when the device is to be used as a cultivator.

Thus by this simple arrangement I obtain a very strong, durable, and efficient device for the purpose designed. The split draft-pole admits of many parts of a framing hitherto necessarily used being dispensed with, while at the same time a very light and strong framing is obtained.

Having thus described my invention, what I claim as new, and desire to secure by Letters Patent, is—

The split and expanded draft-pole C, in connection with the axle A and bars E and O and rods $h$, all arranged as and for the purpose herein set forth.

S. H. MITCHELL.

Witnesses:
 CHRISTIAN SHAFER,
 R. A. McCLELAW.